Nov. 17, 1953
H. A. COOK
2,659,198
EXPLOSION-CYCLE INDUCER-DISK VALVE TURBOJET
ENGINE FOR AIRCRAFT PROPULSION
Filed Aug. 4, 1950
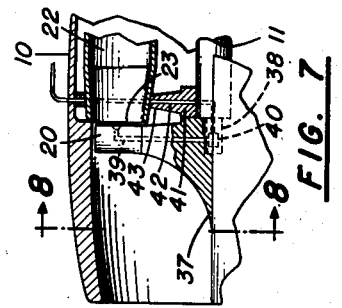
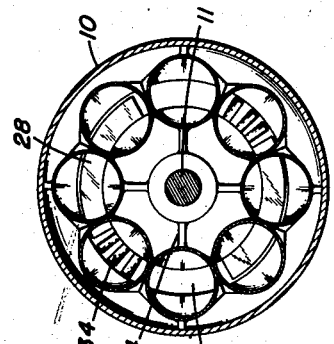
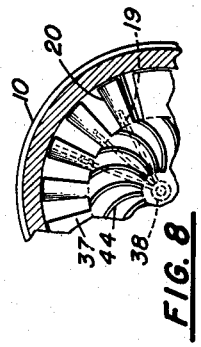
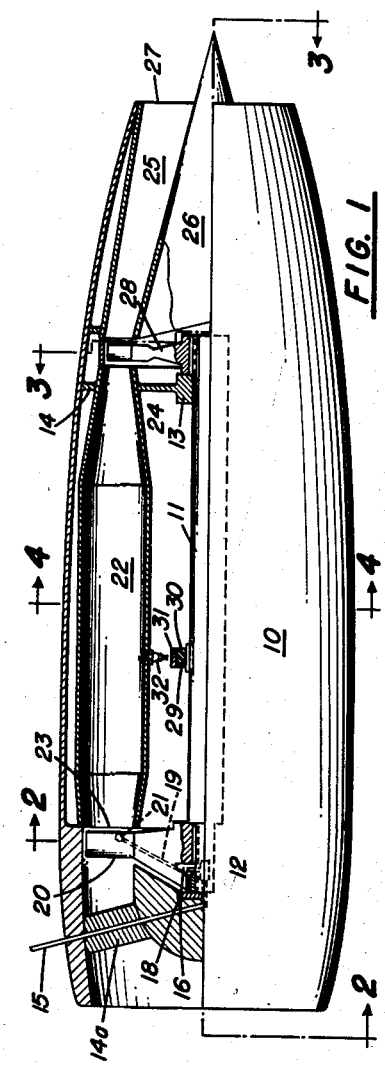
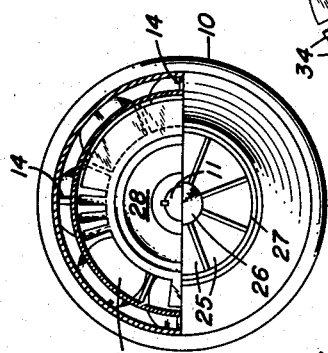
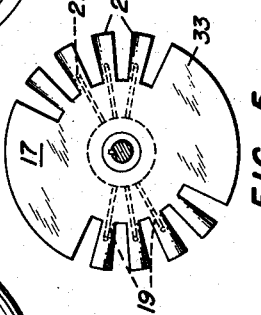
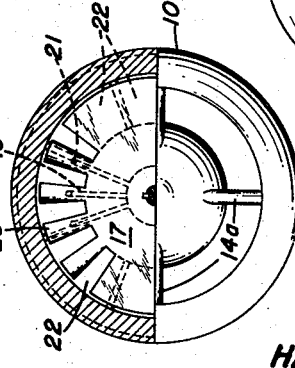
Inventor
HARVEY A. COOK
By
Attorneys Patented Nov. 17, 1953

2,659,198

UNITED STATES PATENT OFFICE 2,659,198

EXPLOSION-CYCLE INDUCER-DISK VALVE TURBOJET ENGINE FOR AIRCRAFT PROPULSION

Harvey A. Cook, University Heights, Ohio

Application August 4, 1950, Serial No. 177,746

11 Claims. (Cl. 60—35.6)

(Granted under Title 35, U. S. Code (1952), sec. 266)

This invention relates generally to turbo-jet engines and specifically to an engine having an inducer-disc air inlet valve for intermittent operation.

An object of the invention is to provide an inexpensive and easily manufactured light weight engine for use with small planes or for expendable aircraft such as guided missiles and target planes.

Another object is to provide an engine having low maintenance and relatively economical operating expenses.

A further object is to provide an engine operable by high velocity gases produced by a series of burners firing intermittently.

A still further object is to provide an engine operable by a gas cycle having a high thermal efficiency and not requiring a high degree of mechanical compression of the air-fuel mixture.

A further object of the invention is to provide a turbo-jet engine having a scavenging cycle in order that over-all temperatures be kept to a minimum and therefore permitting the use of lighter weight materials and less heat resistant metals.

The exact nature of this invention as well as other objects and advantages thereof will be readily apparent from consideration of the following specification relating to the annexed drawing in which:

In Fig. 1 is shown a view of the invention in side elevation partly in section.

Fig. 2 is a view partly in section taken on line 2—2 of Fig. 1.

Fig. 3 is a view partly in section taken on line 3—3 of Fig. 1.

Fig. 4 is a view in section taken on line 4—4 of Fig. 1.

Fig. 5 is a view in elevation of the inducer-disc.

Fig. 6 is a view in elevation of the turbine-disc.

Fig. 7 is a partial view in section of a second embodiment of the inducer-disc, and Fig. 8 is a partial view in elevation of the inducer-disc shown in Fig. 7, the view being taken on line 8—8 of Fig. 7.

Referring to the drawing in which like numerals indicate like parts throughout the several views, shell 10 has rotor 11 within it supported by bearings 12 and 13 and struts 14, 14a. Strut 14a has a fuel passage 15 for conveying fuel from a source of supply (not shown) to the annular chamber 16 formed in the hub of the inducer-disc 17. A conventional packing gland 18 is incorporated in bearing 12 to prevent leakage of fuel. Chamber 16 connects with the radial fuel passages 19 in several of the compressor blades 20 on the periphery of the inducer-disc 17, and fuel is supplied to the nozzles 21 by the impeller action of the passages 19.

The combustion chambers 22 of the engine are circular in cross-section but have flattened and arcuate inlet and outlet ends 23 and 24, respectively. Tail pipes 25 conduct gases from the combustion chambers 22 around tail cone 26 to form the jet nozzle 27. A turbine-disc 28 mounted on the rotor 11 intercepts the gas flow as it enters the tail pipes 25.

On the rotor 11, at a point where it is determined that ignition of the fuel-air mixture in the combustion chamber provides optimum performance, is distributor ring 29 having insulating segments 30 and conducting segments 31. A spark plug 32 projects through the wall of each combustion chamber 22 and is positioned within gapping distance to the distributor ring 29.

As shown in Fig. 5, the inducer-disc 17 has blades 20 and solid portions 33. The turbine-disc 28 has turbine blades 34, solid portions 35 and scavenging parts 36.

A second embodiment of the inlet components of the engine is shown in Fig. 7 in which an inducer-disc 37 has identical blades 20 and solid portions 33 and is positioned on the forward end of the rotor 38. Fuel passages 39 connect with chamber 40 adjacent to the bearing 41 and fuel is conveyed by passage 42 incorporated in one of the struts 43. The inducer-disc 37 of this embodiment has no obstruction forward and may have air scoop blades 44 for increased compression of the intake air.

In operation, the rotor 11, or 38 is given initial rotary motion in the direction shown by the arrows by ram air or conventional starting means (not shown), and as air enters the combustion chambers 16, each one in turn, fuel is injected. The solid portion 35 of the turbine-disc closes each combustion chamber as air is admitted, permitting a degree of compression of the air-fuel mixture whereupon the inlet is closed by portions 33 and ignition occurs. After ignition, blowdown of the combustion gases begins and continues for approximately 45 degrees of rotation, then scavenging air proceeds through the combustion chamber before the solid portion 35 again closes the chamber and a new charge of air and fuel is compressed.

In each of the embodiments shown, there are four compressor blades 20 on each side of the inducer-disc 17, or 37, with three of them having fuel passages 19 and nozzles 21. These embodiments contemplate the firing of diametrically opposed chambers simultaneously. The number of blades and solid sections of the inducer-disc and the turbine-disc may be varied however, to any compatible number, or they may be relatively proportioned to each other to accommodate a greater or lesser air-fuel mass or combustion chamber characteristics. Resonant waves within the combustion chambers may require rotary shifting of the solid portions of the discs relative to each other. The advantage of the engine embodying the inducer-disc and turbine-disc as described over contemporary jet engines of like weight is due to the higher thermal efficiency of the gas cycle and the lower compression needed, since the turbine of such an engine is only required to convert to mechanical energy a relatively small portion of the energy available in the propulsive gases.

It should be understood, of course, that the foregoing disclosure relates to only a preferred embodiment (or embodiments) of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. A turbo-jet engine having an intermittent explosion cycle comprising a body defining an air intake and a jet nozzle; a shaft rotatably supported in said body, a plurality of combustion chambers annularly arranged in said body, a disc rotatable with said shaft at the inlet end of said combustion chamber having sector portions for sequentially compressing air and supplying fuel to and closing off the inlet end of each combustion chamber in sequence, ignition means for each combustion chamber, and a second disc axially aligned with said first disc and rotatable with said shaft at the exhaust end of said combustion chambers, said second disc having sector portions for closing off the chambers while the other disc compresses and supplies fuel thereto and for receiving pressure impulses when the other disc closes the inlets and for opening the exhaust ends while the other disc begins to compress the air into the inlet, in sequence, said first and second discs relatively proportioned and positioned with respect to each other whereby each combustion chamber in turn forms a closed-end cylinder open forwardly for admitting a fuel-air charge, then a closed-end cylinder open rearwardly for explosion, and then an open-ended cylinder at both ends for the passage of scavenging air.

2. The device as set forth in claim 1 in which said first disc includes compressor blading in one or more sector portions for compressing the air as it is admitted to each combustion chamber in sequence.

3. The device as set forth in claim 1 in which said second disc includes turbine blading in corresponding sector portions for imparting rotary motion to said shaft.

4. The device as set forth in claim 1 in which said first disc includes an impeller type fuel injector.

5. The device as set forth in claim 1 in which said second disc includes ports in one or more sector portions for the passage of scavenging air through each combustion chamber in sequence.

6. A turbo-jet engine having an intermittent explosion cycle comprising a body defining an air intake and a jet nozzle; at least one combustion chamber located at one side of the axis in said body; a pair of disc valves with blade portions axially mounted on a common shaft, one valve at the forward and one at the aft end of said combustion chamber operable together to sequentially close the aft end, present a compressor blading portion to compress and admit air at the forward end, close the forward end during ignition and explosion, present a turbine blading portion to the aft end for receiving the pressure impulses of explosion products, and open both ends for the passage of scavenging air through said combustion chamber; fuel injection means operable with and disposed in the forward one of said pair of disc valves; and ignition means in said combustion chamber.

7. The device as set forth in claim 6 in which the forward one of said pair of disc valves has alternatingly spaced solid portions, and compressor blade portions on its periphery.

8. The device as set forth in claim 7 in which at least one of the compressor blades in said compressor blade portion of said disc valve has a radial fuel passage therein and a nozzle facing said combustion chamber whereby fuel is impelled through said passage and injected into said combustion chamber.

9. The device as set forth in claim 8 in which the aft one of said pair of disc valves has sequentially spaced solid portions, turbine blade portions, and port portions on its periphery.

10. The device as set forth in claim 9 in which the series of solid, compressor blade, turbine blade, and port portions are repeated at least twice on said pair of disc valves whereby two or more combustion chambers may be fired simultaneously.

11. A turbo-jet engine having an intermittent explosion cycle with scavenging of exhaust gases comprising a body defining an air inlet and a jet nozzle; a plurality of combustion chambers annularly positioned in said body, a rotor, a disc secured to said rotor forward of said combustion chambers, said disc having at least one group of compressor blades and solid portions sequentially spaced on its periphery, a second disc secured to said rotor aft of said combustion chambers and axially aligned with said first mentioned disc, a similar number of groups of turbine blades portions, solid portions and scavenging port portions sequentially spaced on the periphery of said second disc, ignition and fuel injection means for said combustion chambers, said discs positioned relative to each other on said rotor to admit compressed air to each combustion chamber in turn while the solid portion of the aft disc closes each chamber, thereafter to close the forward end of each chamber during explosion and expansion of gases through the turbine blades of the aft disc, and then to admit compressed scavenging air to each chamber exhausting through said scavenging port portions of said aft disc.

HARVEY A. COOK.

References Cited in the file of this patent

UNITED STATES PATENTS

| Number | Name | Date |
|---|---|---|
| 1,077,314 | Stern | Nov. 4, 1913 |
| 1,291,273 | Tyler | Jan. 14, 1919 |
| 1,395,995 | George | Nov. 1, 1921 |
| 1,584,346 | Ardin | May 11, 1926 |
| 2,323,617 | Osborne | July 6, 1943 |
| 2,515,644 | Goddard | July 18, 1950 |
| 2,538,179 | Weinhardt | Jan. 16, 1951 |
| 2,593,523 | Bauger | Apr. 22, 1952 |

FOREIGN PATENTS

| Number | Country | Date |
|---|---|---|
| 844,442 | France | Apr. 24, 1939 |